(12) United States Patent
Nevill-Manning et al.

(10) Patent No.: US 8,583,808 B1
(45) Date of Patent: Nov. 12, 2013

(54) AUTOMATIC GENERATION OF REWRITE RULES FOR URLS

(75) Inventors: Craig Nevill-Manning, New York, NY (US); Chade-Meng Tan, Santa Clara, CA (US); Aynur Dyanik, Princeton, NJ (US); Peter Norvig, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 12/888,951

(22) Filed: Sep. 23, 2010

Related U.S. Application Data

(63) Continuation of application No. 10/748,655, filed on Dec. 31, 2003, now Pat. No. 7,827,254.

(60) Provisional application No. 60/524,889, filed on Nov. 26, 2003.

(51) Int. Cl.
    *G06F 15/16* (2006.01)
(52) U.S. Cl.
    USPC ............ 709/228; 709/218; 709/223; 707/200
(58) Field of Classification Search
    USPC ............................ 709/218, 228, 223; 707/200
    See application file for complete search history.

(56) References Cited

U.S. PATENT DOCUMENTS

| 5,835,718 | A | 11/1998 | Blewett |
| 5,999,929 | A * | 12/1999 | Goodman ............................ 1/1 |
| 6,718,333 | B1 | 4/2004 | Matsuda |
| 2002/0099731 | A1 * | 7/2002 | Abajian ........................ 707/500 |
| 2002/0099813 | A1 | 7/2002 | Winshell |
| 2003/0037232 | A1 * | 2/2003 | Bailiff ............................ 713/153 |
| 2004/0143787 | A1 * | 7/2004 | Grancharov et al. ...... 715/501.1 |

OTHER PUBLICATIONS

Co-pending U.S. Appl. No. 10/748,655, filed Dec. 31, 2003 entitled "Automatic Generation of Rewrite Rules for URLS" by Craig Nevill-Manning et al., 29 pages.

* cited by examiner

*Primary Examiner* — Quang N Nguyen
*Assistant Examiner* — Hitesh Patel
(74) *Attorney, Agent, or Firm* — Harrity & Harrity, LLP

(57) ABSTRACT

A rewrite component automatically generates rewrite rules that describe how uniform resource locators (URLs) can be rewritten to reduce or eliminate different URLs that redundantly refer to the same or substantially the same content. The rewrite rules can be applied to URLs received when crawling a network to increase the efficiency of the crawl and the corresponding document index generated from the crawl.

20 Claims, 6 Drawing Sheets

601 → http://www.bigonlinestore.com/retail/department.asp?loc=33410&mp=60

602 → http://www.bigonlinestore.com/wholesale/department.asp?loc=33410&mp=40

603 → http://www.bigonlinestore.com/retail/department.asp?loc=32000&mp=45

604 → http://www.bigonlinestore.com/retail/shoes/department.asp?loc=33410&mp=100

605 → http://www.bigonlinestore.com/retail/department.asp?loc=200&mp=100

FIG. 6

AUTOMATIC GENERATION OF REWRITE RULES FOR URLS

RELATED APPLICATIONS

This application is a continuation of application Ser. No. 10/748,655, filed Dec. 31, 2003 which claims priority under 35 U.S.C. §119 based on U.S. Provisional Application No. 60/524,889, filed Nov. 26, 2003, the disclosures of which are incorporated herein by reference.

BACKGROUND OF THE INVENTION

A. Field of the Invention

The present invention relates generally to content retrieval on the world wide web, and more particularly, to automated web crawling.

B. Description of the Related Art

The World Wide Web ("web") contains a vast amount of information. Search engines assist users in locating desired portions of this information by cataloging web pages. Typically, in response to a user's request, the search engine returns references to documents relevant to the request.

Search engines may base their determination of the user's interest on search terms (called a search query) entered by the user. The goal of the search engine is to identify links to high quality relevant results based on the search query. Typically, the search engine accomplishes this by matching the terms in the search query to a corpus of pre-stored web documents. Web documents that contain the user's search terms are considered "hits" and are returned to the user.

The corpus of pre-stored web documents may be stored by the search engine as an index of terms found in the web pages. Documents that are to be added to the index may be automatically located by a program, sometimes referred to as a "spider," that automatically traverses ("crawls") web documents based on the uniform resource locators (URLs) contained in the web documents. Thus, for example, a spider program may, starting at a given web page, download the page, index the page, and gather all the URLs present in the page. The spider program may then repeat this process for the web pages referred to by the URLs. In this way, the spider program "crawls" the world wide web based on its link structure.

Some web sites generate pages dynamically based on parameters specified in the URLs. Some of these parameters may be redundant and may not affect the content returned by the web site. This can result in many different URLs that all refer to the same content. Different URLs that refer to the same content can cause the spider program to redundantly index the web page. This is undesirable, as it can, for example, lead to a decrease in the quality of the operation of the search engine, can affect the feasibility of crawling particular sites, and can significantly increase the cost and time involved in crawling.

Thus, there is a need in the art to more effectively crawl web sites that use different URLs that refer to the same content.

SUMMARY OF THE INVENTION

One aspect consistent with the principles of the invention is a method that includes receiving a first uniform resource locator (URL) including one or more parameters and retrieving content corresponding to the first URL. The method further includes retrieving content corresponding to URLs having different parameter combinations of the one or more parameters, identifying the parameter combination from the URLs that corresponds to content that is approximately the same as the content corresponding to the first URL and that contains a reduced number of parameters, and generating one or more URL rewrite rules based on the identified parameter combination.

Another aspect is directed to a method for converting a URL into a canonical form of the URL. The method includes receiving a URL that refers to content and that contains a parameter set including at least one parameter. The method further includes applying a predetermined rewrite rule to the URL that removes the at least one parameter from the URL when the at least one parameter does not affect the content referred to by the URL, and outputting the rewritten URL as the canonical form of the URL.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 is a diagram illustrating exemplary URLs.

DETAILED DESCRIPTION

The following detailed description of the invention refers to the accompanying drawings. The detailed description does not limit the invention.

As described herein, rewrite rules are generated that describe how URLs can be rewritten to reduce or eliminate different URLs that redundantly refer to the same, or substantially the same, content. The rewrite rules can be applied to URLs received when crawling a network to increase the efficiency of the crawl and the corresponding document index generated from the crawl.

Exemplary Network Overview

Figure 1:
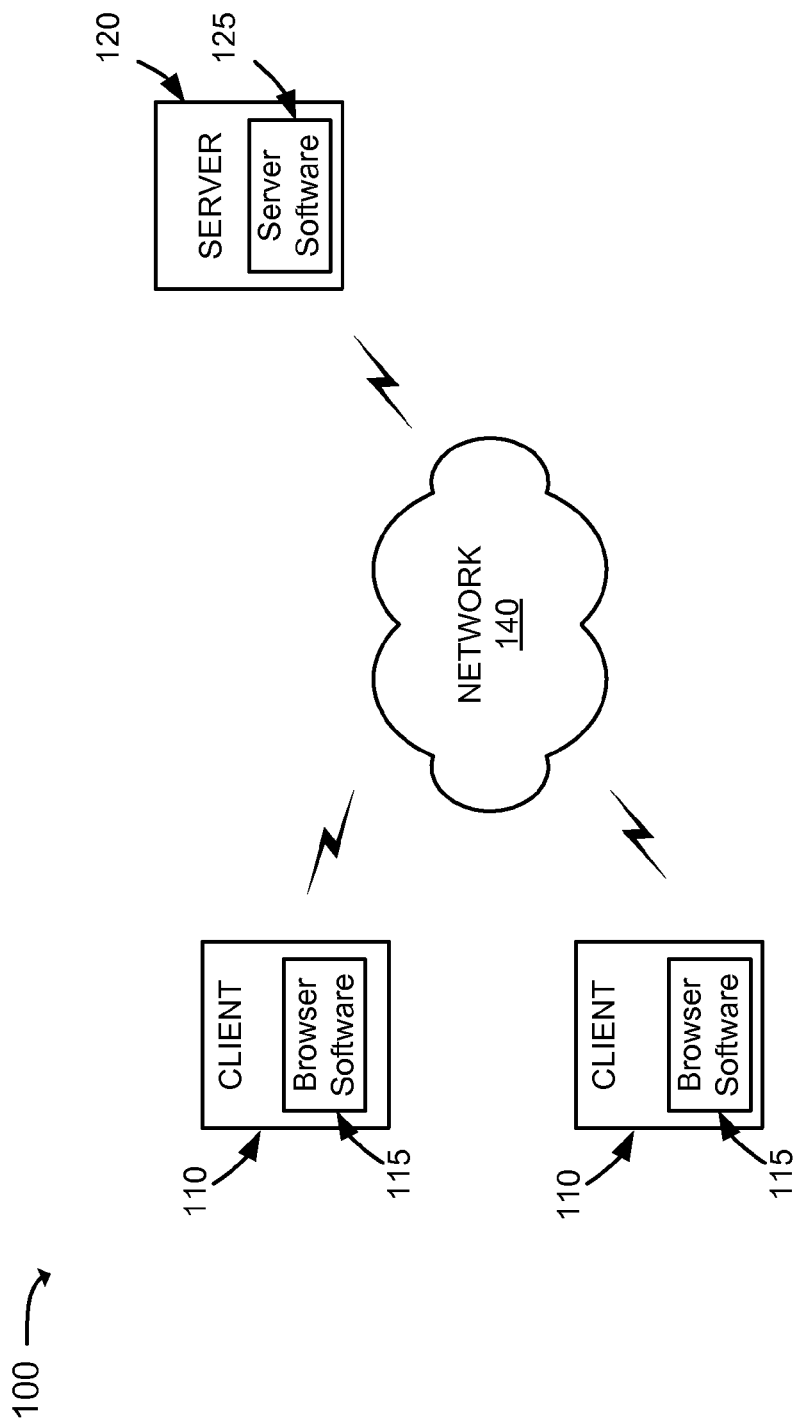
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and a server 120 have been illustrated as connected to network 140 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Server 120 may include server entities that process, search, and/or maintain documents in a manner consistent with the principles of the invention. Clients 110 and server 120 may connect to network 140 via wired, wireless, or optical connections.

Clients 110 may include client software, such as browser software 115. Browser software 115 may include a web browser, such as the existing Microsoft Internet Explorer or Netscape Navigator browsers. For example, when network 140 is the Internet, clients 110 may navigate the web via browsers 115.

Server 120 may operate as a web server and include appropriate web server software 125. In one implementation, web server software 125 may function as a search engine, such as a query-based web page search engine. In general, in response to client requests, the search engine may return sets of documents to clients 110. The documents may be returned to clients 110 as a web page containing a list of links to web pages that are relevant to the search query. This list of links may be ranked and displayed in an order based on the search engine's determination of relevance to the search query. Although server 120 is illustrated as a single entity, in practice, server 120 may be implemented as a number of server devices.

A document, as the term is used herein, is to be broadly interpreted to include any machine-readable and machine-storable work product. A document may be an email, a file, a combination of files, one or more files with embedded links to other files, a news group posting, a web advertisement, etc. In the context of the Internet, a common document is a web page. Web pages often include content and may include embedded information (such as meta information, hyperlinks, etc.) and/or embedded instructions (such as Javascript, etc.).

Exemplary Client/Server Architecture

Figure 2:
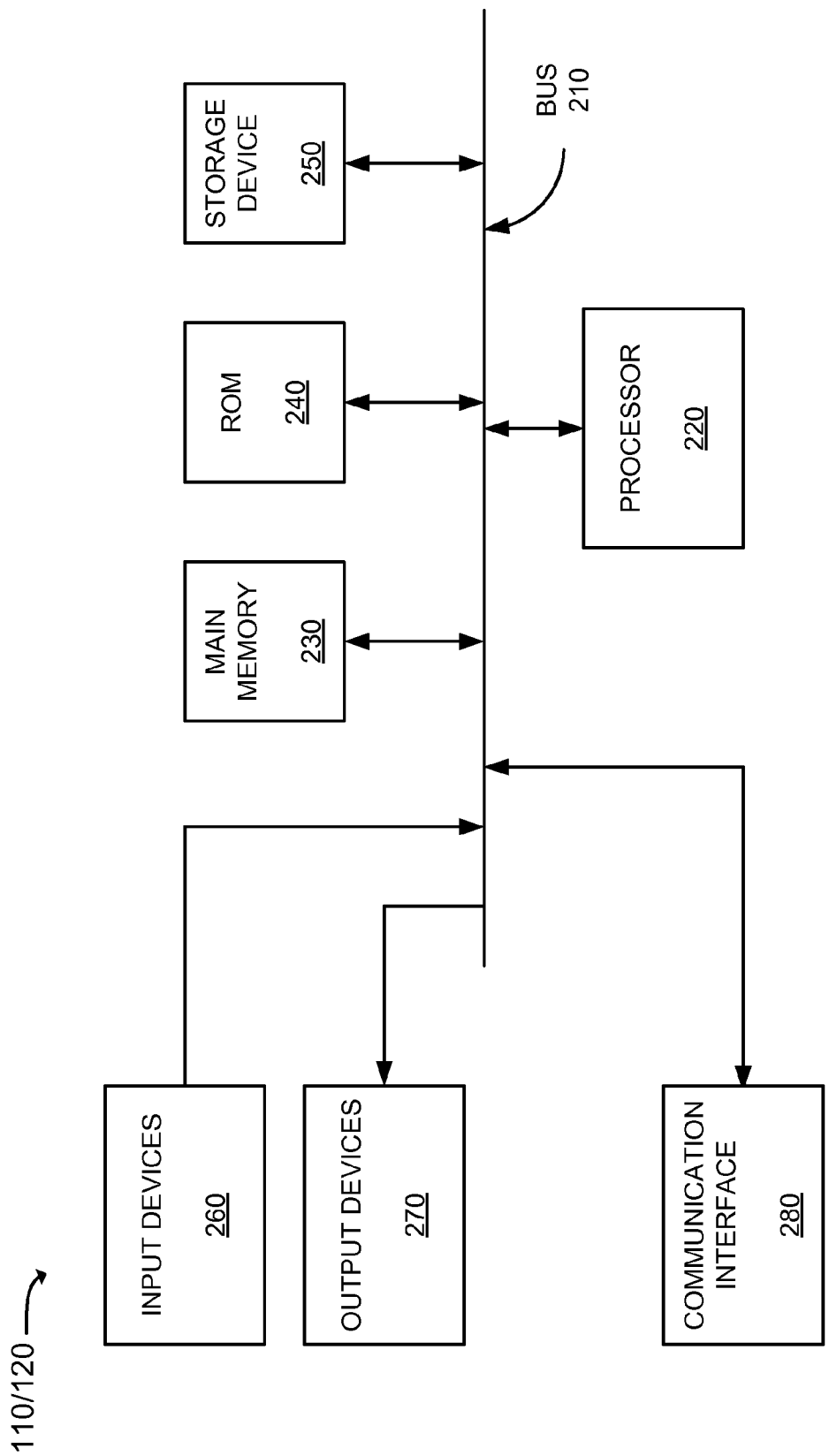
FIG. 2 is a diagram of an exemplary client or server device shown in FIG. 1.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor, or a combination of processors, that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client/server 110/120 to communicate with other devices and/or systems. For example, communication interface 280 may include mechanisms for communicating with another device or system via a network, such as network 140.

The software instructions defining server software 125 and browser software 115 may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

As mentioned, server software 125 may implement a search engine that, based on a user query, returns a list of links to documents that the server software 125 considers to be relevant to the search.

Server Software 125

Figure 3:
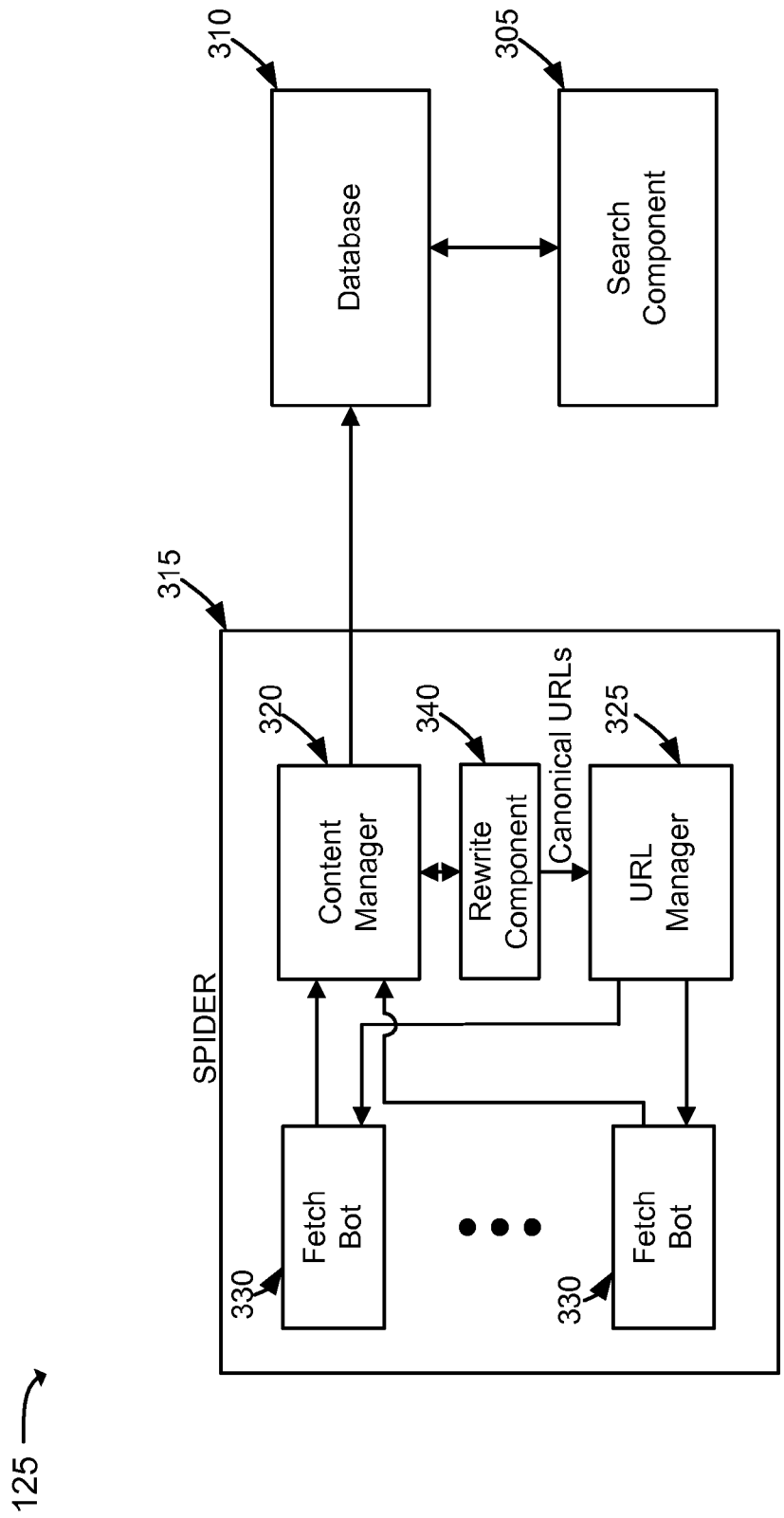
FIG. 3 is an exemplary functional block diagram illustrating an implementation of the server software shown in FIG. 1.

FIG. 3 is an exemplary functional block diagram illustrating an implementation of server software 125. Server software 125 may include a search component 305, a database component 310, and a spider component 315. Although search component 305, database component 310, and spider component 315 are illustrated in FIG. 3 as all being part of server software 125, one of ordinary skill in the art will recognize that these components could be implemented on separate computing devices or clusters of computing devices. Spider component 315 and search component 305, in particular, may be implemented independently of one another.

In general, search component 305 may receive user search queries from clients 110, search database 310 based on the search queries, and return a list of links (e.g., URLs) of relevant documents to clients 110. The list of links may also include information that generally attempts to describe the contents of the web documents associated with the links. The list of links may be ordered based on ranking values, generated by search component 305, which rates the links based on their perceived relevance.

Database component 310 may store an index of the web documents that have been crawled by spider program 315. In one implementation, the index of the web documents may be an inverted index. Database component 310 may be updated as new web documents are crawled and added to database component 310. Database component 310 may be accessed by search component 305 when responding to user search queries.

Spider component 315 may crawl documents available through network 140. The content corresponding to the crawled documents may be forwarded to database component 310. Each crawled document may be identified by the URL that references the document. According to an aspect consistent with the principles of the invention, for dynamically generated URLs in which multiple URLs may refer to identical content, spider component 315 may generate and use rewrite rules to transform the URL into a canonical form. The canonical version of the URLs may ideally have a one-to-one correspondence with document content, potentially resulting in more efficient document crawling and document indexing. In practice, the canonical version of the URL generated by the rewrite rules may not have a perfect one-to-one correspondence with document content. That is, the rewrite rules may not perfectly reduce the many-to-one association of URLs to document content to a one-to-one relationship. However, just reducing the many-to-one relationship can produce advantages to server software 125.

Spider component 315 may include fetch bots 330, content manager 320, rewrite component 340, and URL manager 325. In general, fetch bots 330 may download content referenced by URLs. The URLs that are to be downloaded may be given to fetch bots 330 by URL manager 325, and may have been obtained from previously downloaded pages. URL manager 325 may keep track of the URLs that have been downloaded and what URLs are to be downloaded. Before URL manager 325 processes a downloaded URL in a page, the URL may be processed by rewrite component 340.

Content manager 320 may receive content downloaded by fetch bots 330 and destined for database component 310. Content manager 320 may process the content to extract URLs. URLs may be forwarded from content manager 320 to URL manager 325 and possibly to database component 310.

Rewrite component 340 may transform input URLs (e.g., URLs from content manager 320) into their canonical form (or an approximation of their canonical form). The transformation of input URLs to a canonical form may be based on a predetermined set of rewrite rules. A rewrite rule, may, for example, specify that when a URL is extracted from a particular web site with a particular parameter embedded in the URL, then the particular parameter should be removed from the URL.

Figure 4:
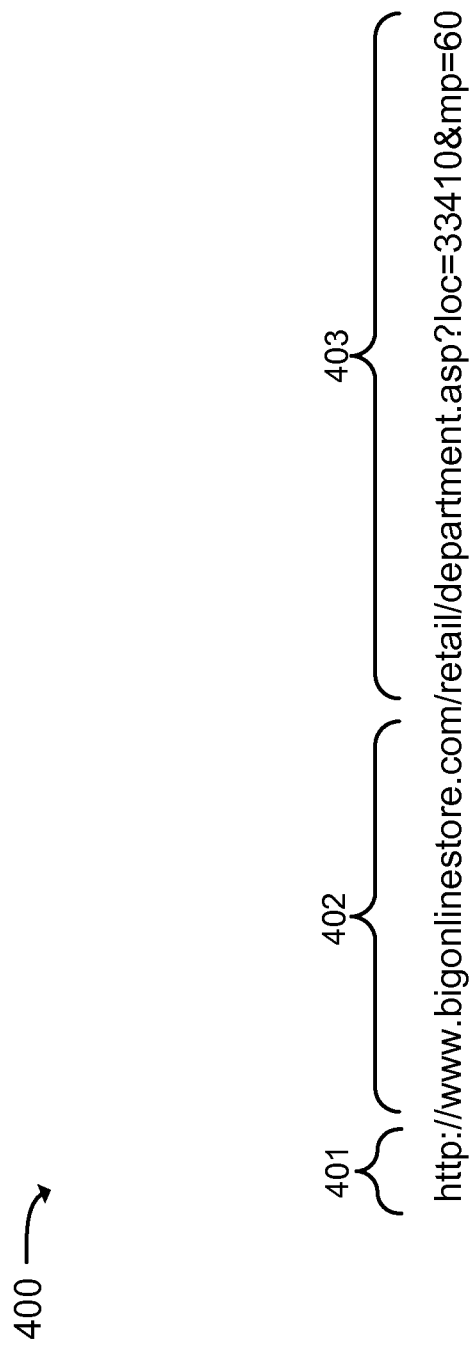
FIG. 4 is a diagram illustrating an exemplary URL.

Before describing generation of the rewrite rules for rewrite component 340 in additional detail, it may be helpful to examine the structure of an exemplary URL. FIG. 4 is a diagram illustrating an exemplary hypertext transfer protocol (HTTP) URL 400. Other protocols, such as secure HTTP (HTTPs), may also be used.

Exemplary URL 400 begins with the HTTP prefix 401 indicating that the referenced content should be transferred using the well known hyper-text transfer protocol. Domain 402 specifies the particular entity or organization that is to handle the information request. In this example, the computing device (e.g., web server) "www" at the Internet address "bigonlinestore.com" is to handle the information request. Section 403 identifies the particular document that the computing device will return to the user. In this example, the document may be the active server page (".asp") "department" in the directory "retail."

Section 403 may additionally include a number of parameters used internally by the web server. Parameters may be separated from one another by the ampersand symbol ("&"). Thus, in the example, two parameters "loc" and "mp" are present. One of ordinary skill in the art will recognize that symbols other than the ampersand may be used to separate parameters. The parameter "loc" has the value 33410 and the parameter "mp" has the value 60. The parameters may generally be arbitrary parameters (e.g., random or non-random sequences of alpha-numeric characters) assigned by the web server, and may be used for a number of functions, such as assisting the web server in tracing user surfing patterns throughout the web site, tracking product categories, etc. Some of the parameters may have no affect on the delivered content.

Figure 5:
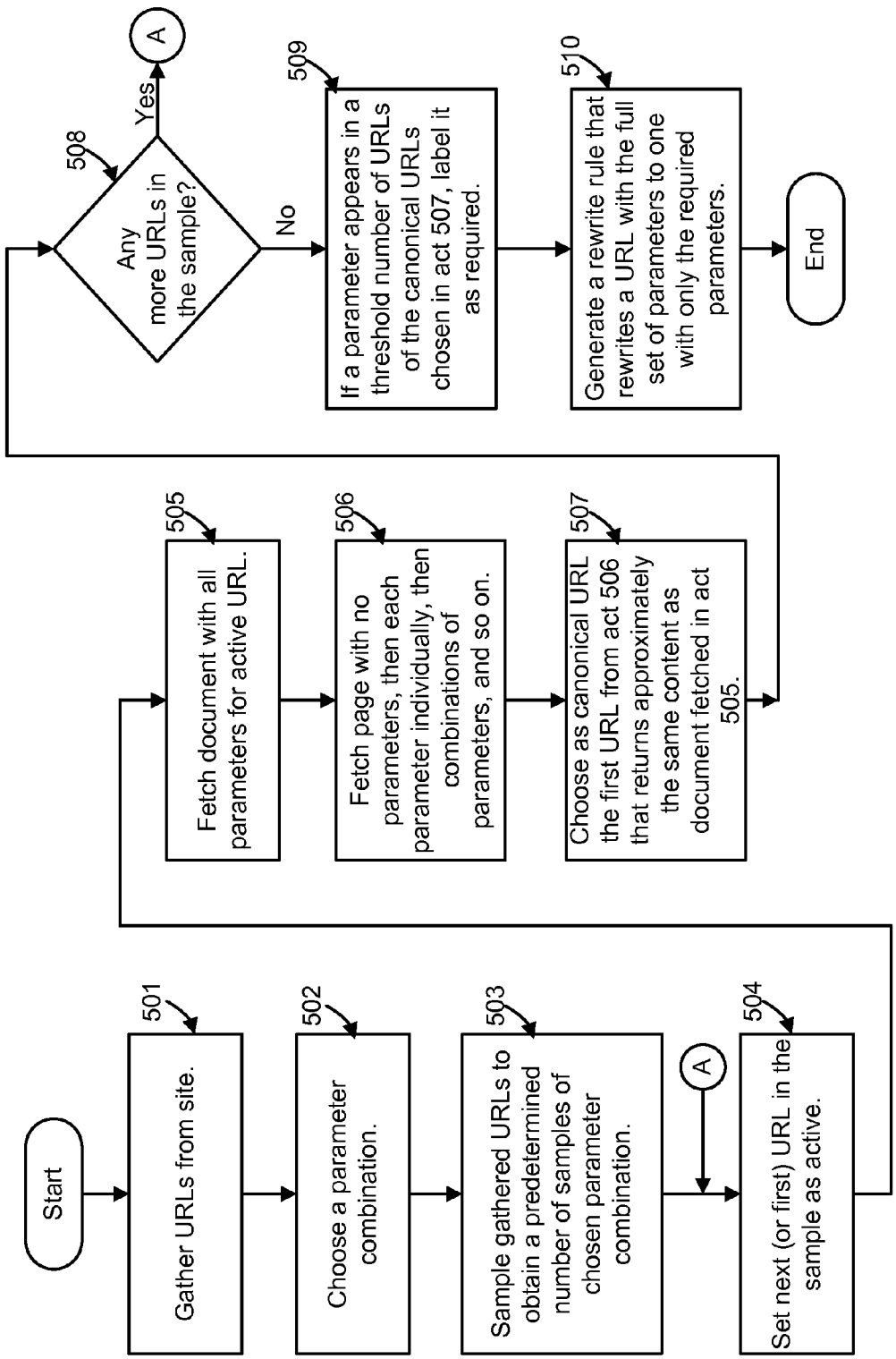
FIG. 5 is a flow chart illustrating generation of rewrite rules.

FIG. 5 is a flow chart illustrating operations according to aspects consistent with the principles of the invention for generating rewrite rules for rewrite component 340. Rewrite component 340 may begin by gathering URLs from a particular web site or web host (act 501). The URLs may, for example, be gathered from multiple web documents received by content manager 320 that were crawled by fetch bots 330. The crawl may be a "promiscuous" crawl that imposes few restrictions on dynamic URLs. The crawl may be biased toward novel parameter combinations in the crawled URLs. In general, the goal is to collect a number of URLs from a particular web site or web host that contain multiple parameter-value combinations that can be analyzed.

Rewrite component 340 may next choose a particular parameter combination that occurs in the URLs gathered in act 501 (act 502). The parameter combination may be a parameter combination that occurs a number of times in the gathered URLs. URL 400, for example, includes the parameter combination "loc" and "mp." Rewrite component 340 may then sample the gathered URLs to obtain at least a predetermined number (e.g., five) of different URLs that contain the chosen parameter combination (act 503). FIG. 6 is a diagram illustrating an exemplary sampled set of five URLs 601-605 gathered from the host "bigonlinestore.com" and that include the parameter combination "loc" and "mp." The values associated with the parameters in the sampled URLs 601-605 may be different between different samples 601-605.

Rewrite component 340 may then select and fetch the first URL (e.g., URL 601) from the sampled set and fetch the document, such as the web page, corresponding to the URL (acts 504 and 505). This corresponds to a fetch of the document with all the parameters. Rewrite component 340 may additionally fetch the document with URL 601 having all the parameters removed, then each parameter individually, then all combinations of two parameters, and so on through various (or all) possible parameter combinations (act 506). For the exemplary URL 601, the possible URL parameter combinations in act 506 would include: "http://www.bigonlinestore.com/retail/department.asp?," "http://www.bigonlinestore.com/retail/department.asp?mp=60," and "http://www.bigonlinestore.com/retail/department.asp?loc=33410." The canonical version of URL 601 may then be selected as a URL (e.g., the first URL) from the combinations in act 506 that corresponds to approximately the same content as that of the document fetched in act 505 (act 507). By selecting the first URL in act 507, rewrite component 340 will select a URL with the least number of parameters but that corresponds to content that matches the original content. A document having "approximately the same content" as another document may be determined using any of a number of known document comparison techniques, such as comparison techniques based on a similarity hash. Approximate document content, instead of identical document content, may be useful because fetched documents are often generally identical but may contain certain elements, such as embedded advertisements, that may change.

Referring back to URL 601, assume that the URL with no parameters and the URL "http://www.bigonlinestore.com/retail/department.asp?mp=60," which includes the parameter "mp", returned a page different than that returned for the full URL 601 but that the page "http://www.bigonlinestore.com/retail/departmentasp?loc=33410" returned approximately the same content. In this situation, the parameter "loc" would be chosen as a parameter required in the canonical form of the URL.

Acts 504 through 507 may then be repeated for each additional URL 601-605 (act 508). In the example of FIG. 6, in which five URLs 601-605 were sampled, this would result in the generation of five URLs labeled as canonical URLs in act 507. If a parameter appears in a threshold number of these canonical URLs, such as in four or more, rewrite component 340 may label the parameter as required and generate a rewrite rule that rewrites a URL with the full set of parameters to one with only the required parameters (acts 509 and 510). The generated rewrite rule may then be used to generate canonical URLs from input URLs. For the example URLs given above, the rewrite rule may be: for each URL from the web host "bigonlinestore.com" that has the two parameters "loc" and "mp," remove the parameter "mp" and its associated value from the URL. Other rewrite rules are possible. For example, the rewrite rules may allow other unspecified parameters to be in the input URL. In other words, the URL could include a superset of the parameters in the rewrite rule. The rewrite rule may then either specify parameters to remove (any extra parameters remain in the rewritten URL) or parameters to keep (any extra parameters are deleted). The above example did not take the path into account (i.e., the string after the hostname and before the "?") when generating the rewrite rules. In alternate implementations, the path may be considered to be similar to a parameter and may be taken into account when generating rewrite rules.

CONCLUSION

As discussed above, rewrite rules are automatically generated that reduce the multiplicity of URLs that correspond to the same, or substantially similar, content. The rewrite rules may be applied when indexing, crawling, or otherwise processing content in order to reduce redundancy.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For instance, some of the acts shown in FIG. 5 could be implemented in a different order or in parallel. Additionally, some of the acts may be omitted.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed:

1. A device comprising:
a memory to store instructions; and
at least one processor to execute the instructions to:
receive a uniform resource locator (URL) that includes a plurality of parameter strings,
each of the plurality of parameter strings including a plurality of characters,
generate a plurality of URLs,
each of the generated plurality of URLs including at least one of the plurality of parameter strings included in the received URL, and
each of the generated plurality of URLs differing from other ones of the generated plurality of URLs and from the received URL,
identify one or more URLs, of the generated plurality of URLs,
content located at the one or more URLs corresponding to content located at the received URL,
identify one or more parameter strings, of the plurality of parameter strings, that appear in at least a threshold quantity of the one or more URLs,
generate a rewrite rule based on the one or more parameter strings,
the rewrite rule, when applied to the received URL, removing, from the received URL, at least one parameter string, of the plurality of parameter strings, that differs from the one or more parameter strings to create a rewritten URL, and
associate, in an index, the content located at the received URL with the rewritten URL.

2. The device of claim 1, where the at least one processor, when identifying the one or more parameter strings, is further to:
include, in the one or more parameter strings, a particular parameter string included in each of one or more URLs.

3. The device of claim 2, where the received URL is associated with a web site or a web host, and
where the at least one processor is further to:
apply the rewrite rule to one or more other URLs associated with the web site or the web host.

4. The device of claim 1, where the at least one processor, when generating the plurality of URLs, is further to:
include, in each of the generated plurality of URLs, two or fewer of the plurality of parameter strings.

5. The device of claim 1, where the index omits references to the received URL and the one or more URLs.

6. A method comprising:
identifying, by at least one processor in at least one computer device, a plurality of different uniform resource locators (URLs),
each of the plurality of URLs including one or more of a plurality of parameters included in a particular URL;
comparing, by at least one processor in at least one computer device, respective content located at each URL of the plurality of URLs and the particular URL;
identifying, by at least one processor in at least one computer device and based on comparing the respective content, a set of URLs of the plurality of URLs,
the respective content located at each URL in the set of URLs including at least a threshold amount of the content located at the particular URL;
identifying, by at least one processor in at least one computer device, at least one of the plurality of parameters,
each of the at least one of the plurality of parameters being included in less than a threshold quantity of the set of URLs;
removing, by at least one processor in at least one computer device, the at least one of the plurality of parameters from the particular URL to form a rewritten URL; and
associating, by at least one processor in at least one computer device and in an index, the content located at the particular URL using only the rewritten URL.

7. The method of claim 6, where identifying the at least one of the plurality of parameters includes:
identifying, as one of the at least one of the plurality of parameters, a parameter that is not included in each of the set of URLs.

8. The method of claim 7, where removing the at least one of the plurality of parameters from the particular URL includes:
forming, based on the at least one of the plurality of parameters, a rewrite rule, the rewrite rule causing the at least one of the plurality of parameters to be removed from the particular URL, and where the method further includes:
    identifying a web site or a web host associated with the particular URL; and
    applying the rewrite rule to one or more other URLs associated with the web site or the web host.

9. The method of claim 6, where comparing the respective content include:
    retrieving the respective content located at the plurality of URLs and the particular URL;
    forming a hash of the respective content; and
    comparing the hash of the respective content.

10. The method of claim 6, where generating the plurality of URLs includes:
    including, in each of the plurality of URLs, two or fewer of the plurality of parameters.

11. The method of claim 6, further comprising:
    receiving the particular URL; and
    identifying the plurality of parameters from the particular URL.

12. A device comprising:
    one or more processors to:
        receive a uniform resource locator (URL) that includes a plurality of parameter strings, each of the plurality of parameter strings including a plurality of characters,
        identify URLs that differ from the received URL, each of the URLs including at least one of the plurality of parameter strings included in the received URL,
        identify two or more URLs of the URLs,
            respective content located at the two or more URLs corresponding to content located at the received URL,
        identify one or more parameter strings, of the plurality of parameter strings, included in at least a threshold quantity of the two or more URLs,
        form, based on the identified one or more parameter strings, a rewrite rule,
        apply the rewrite rule to the received URL to form a rewritten URL that includes the identified one or more parameter strings and excludes at least one parameter string of the plurality of parameter strings, and
        associate, in an index, the content located at the received URL with the rewritten URL.

13. The device of claim 12, where the one or more processors are further to:
    identify a web site associated with the received URL, and extract the URLs from content located at the web site.

14. The device of claim 12, where the one or more processors, when associating the content located at the received URL with the rewritten URL, are further to:
    associate, in the index, the content located at the received URL only with the rewritten URL.

15. The device of claim 12, where the one or more processors, when identifying the two or more URLs, are further to:
    form first hashes of the respective content located at the URLs and a second hash of the content located at the received URL, and
    compare the first hashes to the second hash to identify corresponding content.

16. The device of claim 1, where the one or more processors, when generating the plurality of URLs, are further to:
    include, in each of the URLs, two or fewer of the plurality of parameter strings.

17. The device of claim 1, where the at least one processor is further to:
    cause a crawler to crawl a web site, associated with the particular URL, using the rewritten URL, the crawler not using the received URL when crawling the web site.

18. The method of claim 6, where identifying the plurality of URLs includes:
    gathering URLs from a web site or a web host associated with the particular URL;
    identifying particular parameters, of the plurality of parameters included in the particular URL, that are also included in at least a particular quantity of the gathered URLs; and
    selecting, as the plurality of URLs, ones of the gathered URLs that include the particular parameters.

19. The method of claim 6, further comprising:
    causing a crawler to crawl a web site, associated with the received URL, using the rewritten URL, the crawler not using the received URL when crawling the web site.

20. The device of claim 12, where one or more processors are further to:
    cause a crawler to crawl a web site, associated with the received URL, using the rewritten URL, the crawler not using the received URL when crawling the web site.

* * * * *

UNITED STATES PATENT AND TRADEMARK OFFICE
CERTIFICATE OF CORRECTION

| | |
|---|---|
| PATENT NO. | : 8,583,808 B1 |
| APPLICATION NO. | : 12/888951 |
| DATED | : November 12, 2013 |
| INVENTOR(S) | : Craig Nevill-Manning et al. |

It is certified that error appears in the above-identified patent and that said Letters Patent is hereby corrected as shown below:

Title Page, please correct the Inventors (75) to read as follows:

Craig Nevill-Manning, New York, NY (US);
Chade-Meng Tan, Santa Clara, CA (US);
Aynur Dayanik, Princeton, NJ (US);
Peter Norvig, Palo Alto, CA (US)

Signed and Sealed this
Fifteenth Day of April, 2014

Michelle K. Lee
*Deputy Director of the United States Patent and Trademark Office*